May 8, 1956  R. A. CHACE ET AL  2,744,501
TOGGLE LOCK ACTUATOR ASSEMBLY
Filed May 18, 1953

INVENTORS.
RICHARD A. CHACE
GEORGE C. NEWELL JR.
BY
Reynolds, Beach & Christensen
ATTORNEYS United States Patent Office 2,744,501
Patented May 8, 1956

2,744,501

TOGGLE LOCK ACTUATOR ASSEMBLY

Richard A. Chace, Bellevue, and George C. Newell, Jr., Seattle, Wash., assignors to Boeing Airplane Company, Seattle, Wash., a corporation of Delaware Application May 18, 1953, Serial No. 355,522

10 Claims. (Cl. 121—40)

In the broad sense the present invention concerns the releasing of a lock which holds two relatively reciprocable elements in a given limit position, for movement towards the opposite limit position, under the influence of a force urging the two elements so to move, the release being effected preferably by application of the urging force to the lock also, and in a manner to effect sudden release of the lock from engagement over an area of contact which is sufficiently extensive that no appreciable wear occurs as a result, as heretofore in such locks, of the progressive decrease in the area of their contact to zero. The invention is illustrated in its application to one end of an aircraft hydraulic strut, but it is to be understood that the application of forces hydraulically, while desirable, is not essential; that the application to one end is to be understood as illustrating the possibility of application to either or to both ends; and that the illustrated mounting of the locking dog elements upon the cylinder head or a part supported therefrom, and the location of the dog-engaged beveled shoulder upon the piston or an extension thereof, does not preclude the reversal of such relation.

Hydraulic jack means or struts are used, in aircraft construction particularly, as a means of effecting movement of a controlled part from one position to another. It is usually desirable to lock the strut in at least one position, as in the extended position against inadvertent collapse, or in the retracted position against accidental extension, or both. As an example, hydraulic jack means are employed to move a landing unit from a retracted to a projected or landing position, and vice versa, and it is essential that the landing unit be locked in each such position against the possibility of accidental movement therefrom. Such locking mechanism should be positive and mechanical to guard against the possibility of failure or leakage in the hydraulic system. In addition it is desirable that such locking mechanism be releasable in advance of, and often desirably by the same pressure fluid as is employed to effect immediately subsequent actuation of the jack means or strut from its locked position.

Mechanisms to the general ends above are old and well known. However, all have not worked with entire satisfaction under all conditions of service. Often the mechanical locking is accomplished through the intermediary of locking elements, such as a dog engageable behind a shoulder, which release by gradual slippage of one surface over the other, and which upon release, or preparatory thereto or during the operation of releasing, are subjected to severe forces applied eventually to very small areas. Often the locking elements are balls, having only point contacts. The result of the original or the decreasingly small area of contact during release, and the resultant increasingly high concentration of loads thereon, is to wear parts unduly. If worn parts are not frequently replaced failure may result, such as failure to retain parts securely locked in extended position. It is to the problem just discussed that the present invention is directed.

It is the object of the present invention to provide a mechanical lock of the general character described which will be entirely positive in its locking engagement, but which is so constructed, and with parts so related, that the application of a force (usually a pressure fluid) to effect unlocking and movement of parts of the strut away from locked position will lessen the area of locking contact virtually imperceptibly until such time as the locking force has diminished to a value so small that it is suddenly and decisively overcome by the displacing forces. Thereupon the unlocking movement occurs so rapidly and with such slight resistance, and in such direction, that there is only a minimum of wear on the locking parts as they return to unlocked position.

More particularly, according to this invention small locking dogs having beveled surfaces which in locked position are engaged full face with complementally beveled surfaces on the part which is to be locked (usually a piston or the like which has appreciably greater inertia than the dogs), whereby the force which acts on the locked part and which the locking dogs resist nevertheless, through the complemental bevels, urges the locking dogs out of locking position and into a withdrawn position, are combined in a new relationship with toggle arms which when aligned positively prevent any such withdrawing movement of the beveled locking dogs. When positive rotation of the toggle arms or other such devices from their aligned with their dogs locking position is initiated, the geometry of the system permits no appreciable withdrawing movement of the locking dogs until quite appreciable angular movement of the arms has occurred, so that the complemental beveled surfaces of the dogs, nor consequent lessening of the area of contact, and of the locked part remain in substantially full face engagement without substantial dimensation of those areas, and appreciably no movement of the locked part away from its locked position can occur. After some slight angular movement of the arms has occurred—the critical angle depending upon a combination of several factors—the force acting upon the locked part, and tending to move it in opposition to the locking dogs, acts through the beveled surfaces and suddenly overcomes the resistance of the toggle arms, now no longer aligned; this force, added to the positive force tending to move the dogs from locked position, snaps the relatively small dogs, of low inertia, to their withdrawn position. The collapse of the resistance of the toggle arms is so sudden, the interengagement of the beveled surfaces at the instant of release is so full, the withdrawal of the dogs' beveled surfaces produces a component of their movement such as withdraws the dogs' surfaces ahead of the beveled surfaces of the released and now advancing part previously locked, and the withdrawal of the dogs is so much more rapid than the advance of the previously locked part because of the latter's greater inertia, that there is in effect instantaneous separation of the complementally beveled surfaces from virtually full face engagement, in a direction more or less normal to those beveled surfaces, and wear on both such surfaces is extremely slight over long periods of operation.

Such a lock is positive and capable of withstanding almost unlimited forces which would tend to move the parts from their locked position, but the toggle arms can be actuated for unlocking by mechanism so related to the strut as a whole and to its actuating means, as will enable and facilitate collapse of the toggle lock under the influence of the strut-actuating forces before any large unlocking movement of the toggle arms has occurred.

In locking mechanism of the nature described, in which although the latching or locking dogs may be in one or the other of two positions, a projective locking position or a retractive disengaged position, they are always, or are under certain conditions, biased to move toward the locking position, and there is provided in the combination a retainer means which will automatically prevent such movement into locking position from retractive position, until such time as the retainer means are automatically engaged by the movable part to be locked, and shifted thereby to a withdrawn position, thereby preventing the locking means from obstructing the part's movement into locking position and permitting prompt and substantially instantaneous movement of the locking elements into locked position at the proper time.

These and similar objects, more especially such as pertain to the mechanical details of the present invention, will be better understood as this specification progresses.

In the accompanying drawings the invention is shown in an illustrative form of mechanism such as is presently preferred by us.

Figure 1:
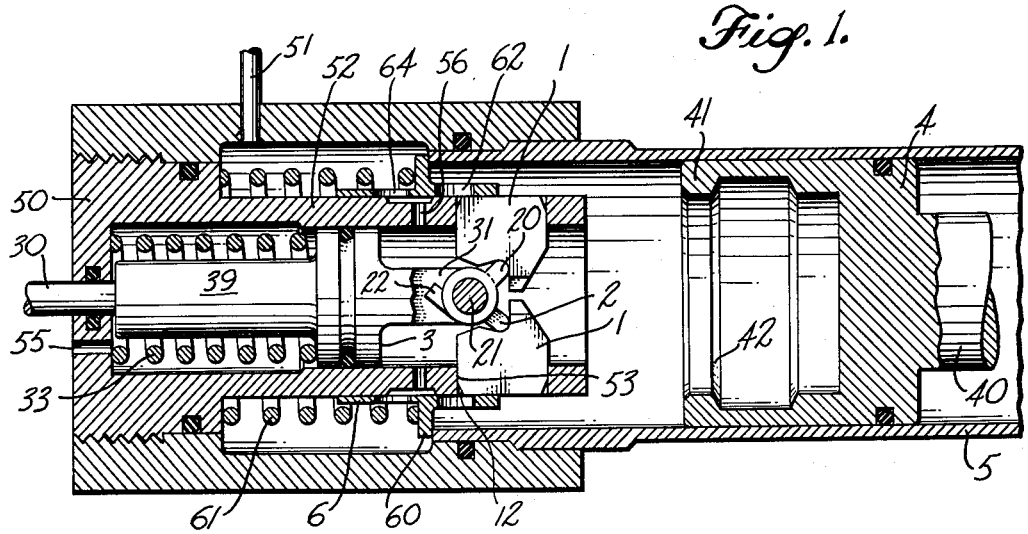
Figure 1 is an illustration of one end of the hydraulic jack means incorporating the locking means of this invention, parts being shown in an unlocked position, the view being in general a section axially of the hydraulic jack means.

A piston 4, slidable axially of a cylinder 5, with its rod 40 and the cylinder head 50, constitute the essential elements of a hydraulic jack means or the like. According to the present invention the piston 4 is skirted, its skirt 41 being shown projected toward the head 50. For a purpose which will shortly appear, the interior wall of the skirt 41, at at least one end, is circumferentially beveled as indicated at 42. Pressure fluid is admitted to, and may be discharged from, the space between the head 50 and the piston 4 by means of the conduit at 51, whereby to move the piston lengthwise of the cylinder.

Projecting toward the piston 4 from the head 50 is a sleeve 52. At its inner end, that is, the end nearer the piston, the sleeve is small enough that the skirt 41 may pass thereover, and the travel of the piston is such that this will occur as the piston approaches this limit of its movement. The inwardly projecting portion of the sleeve is radially slotted, as is indicated at 53, and in order to achieve evenness of application of the forces it is preferred that these slots be diametrically opposite one another, or if there are more than the two shown, that they be equiangularly spaced.

Figure 2:
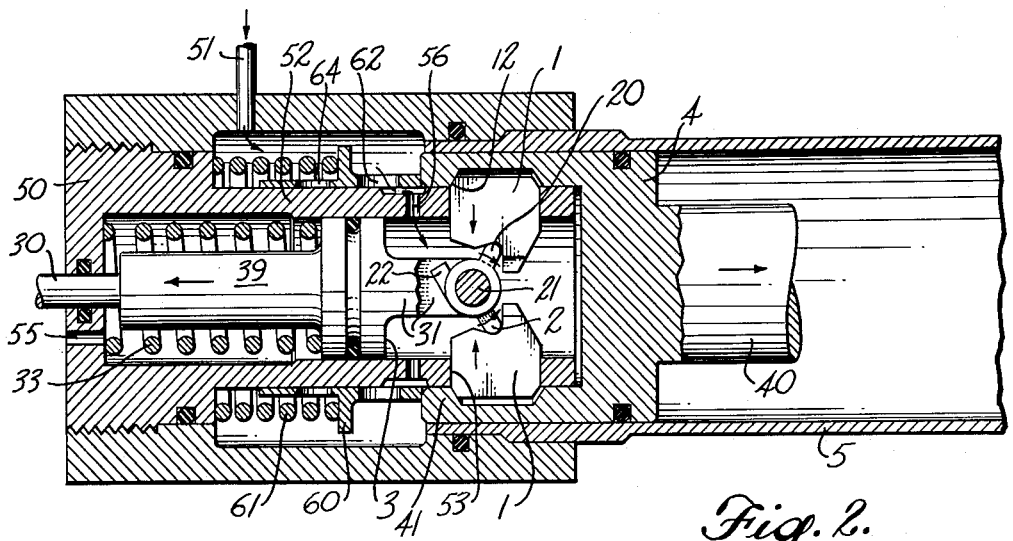
Figure 2 is a similar view showing the parts in the process of releasing from locked position.
Figure 3:
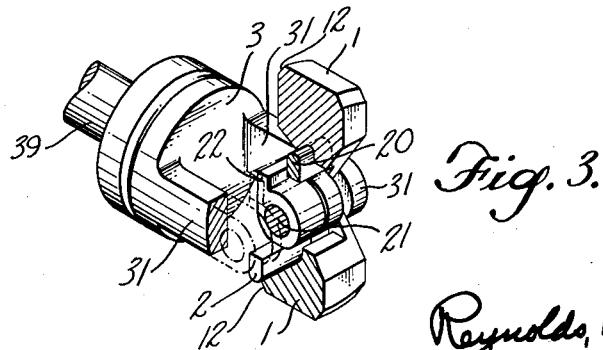
Figure 3 is an isometric view, partly broken away and shown in section, illustrating the details of the latching dogs, the toggle lock therefor, and the actuating means for the toggle lock assembly as a whole, separate from the other parts of the mechanism, all parts being shown in fully locked position.

Latching dogs 1 are guided in these slots 53 for movement from a retractive position, wherein they are shown in Figure 1, to a projective position, such as the position shown in Figure 2, or the fully projected position of Figure 3. Usually these dogs 1 move precisely radially. When in their retractive position their ends are withdrawn flush with or beneath the exterior circumferential surface of the sleeve 52. When in their projective position they will project outwardly beyond the sleeve 52 to engage behind the bevel 42 of the skirt, and these dogs, at least at their end which is nearer the head 50, are beveled, as indicated at 12, complementally to the bevel at 42. The dogs may be beveled at both ends, and the skirt may be similarly and complementally beveled.

The dogs are held in their projective or locking position by an actuator assembly, which preferably includes toggle arms 2 and 20. These are mutually pivoted at 21 upon a bracket or yoke 31 which projects forwardly, or toward the piston, as part of a plunger 39 which includes also a pressure face 3. The toggle arms are provided with a stop member 22 on the toggle arm 2, which when engaged with the toggle arm 20, as in Figure 3, holds parts locked in a position wherein the toggle arms are directed substantially precisely radially, whereby they can resist great forces tending to press the dogs 1 inwardly.

The plunger 39 may likewise include an exteriorly projecting actuating rod 30, which may be connected to indicator means or to a handle for manual operation, and a compression spring 33 may react between the head 50 and the plunger 39 to urge the latter to the right, or toward the piston 4 and away from the head 50. In lieu of the spring 33, which constitutes a constant biasing means, the pressure head 3 may be subject on its back face to pressure fluid admitted by way of the port 55, which would constitute a momentary biasing means, or this port may constitute merely a vent port. Where the spring 33 is employed its force tends at all times to urge the plunger to the right, and to move the toggle arms 2 and 20 into their radial positions, wherein they press and hold outwardly the latching dogs 1. Where pressure fluid, admitted at 55, is employed, such a biasing force may be applied to the same end whenever required, and not constantly.

In order that the latching dogs may not be thus pressed outwardly to block completion of the piston's movement to the left or toward the head 50, a retainer means is employed, which consists in effect of an annulus 6, surrounding the sleeve 52, and guided thereby for axial movement along the sleeve. This annulus 6 is of a length, and its permitted movement is such, that in what may be called the retaining position of Figure 1 it overlies the outer ends of the dogs 1, and prevents their projective movement. It is held in this position by biasing means such as the spring 61 reacting between the head and a flange 60 on the annulus. This flange 60 also serves as a stop to limit the movement of the annulus away from the head, where it contacts the shoulder defined by the end of the cylinder 5, as in Figure 1.

In its retaining position the retainer's end lies within the locus of the piston 4 or its skirt 41. The piston, being acted upon by pressure fluid tending to urge it to the left, will readily overcome the biasing force of the spring 61 when its end contacts the end of the annulus 6, and so will move the annulus back to a position such as that shown in Figure 2, wherein the spring 61 is compressed, but the annulus is in a withdrawn position, clear of the ends of the dogs 1. With the annulus thus withdrawn, the dogs 1 are free to snap outwardly, under the influence of the biasing force such as the spring 33, as soon as the beveled shoulder 42 of the piston's skirt passes beyond the beveled end 12 of the dogs. As soon as this projective movement is completed and the stop 22 contacts the toggle arm 20, the toggle arms, being in substantially precisely radial position, will hold parts locked against any conceivable force that is likely to be applied directly to the jack's parts to unlock the jack means.

Whenever it is desired to unlock the latching dogs— and it is with this phase that the present invention is primarliy concerned—it is only necessary to admit pressure fluid to the space between the pressure face 3 of the plunger 39 and the piston 4. Such pressure fluid can be admitted by way of the conduit at 51, and through ports 62 in the annulus 6 and 56 in the sleeve 52, as is illustrated in Figure 2. This pressure fluid will react both on the piston and on the pressure face 3, urging them apart. The piston being locked, the plunger 39 will move to the left first, and in so doing it wil move the toggle arms 2 and 20 toward collapsed position, as they are shown in process of moving in Figure 2. The dogs 1 will move inwardly, but scarcely perceptibly, and will still retain substantially full face contact between the bevels 12 and 42, until the geometry of the toggle arms becomes such that they can no longer resist the forces applied to them by the piston, as it is urged away from the head, through the coacting bevels 12 and 42. As soon as that occurs, these forces, through the bevels, will themselves assist in effecting complete and sudden collapse of the latching dogs and of the toggle arms. The dogs and their associated parts are of relatively small mass and low inertia, as compared with the piston 4, and will consequently move rapidly inwardly. This inward movement in itself tends to pull the dogs' beveled surfaces 12 away from the piston's beveled surface 42, so that the disengagement becomes largely a pull-away more or less normal to the complemental beveled surfaces, rather than a sliding of surfaces of constantly lessening, and finally zero, area, one over the other. The result is that instead of grinding away the contacting surfaces at the bevels 12 and 42, or equivalent surfaces, particularly at their tips, as has been the case in the past, the contact between the locking surfaces is of comparatively large area at the time when collapse occurs, and the forces are almost completely and instantaneously relieved. It follows that there is but little wearing down of the interengaging locking surfaces.

It will be noted that in addition to the ports 62, the annulus 6 is provided also with ports 64, which in the locked position are masked, but which upon movement of the annulus to retaining position, as in Figure 1, come into registry with the ports 56, and so even though at that time the ports 62 become masked, the pressure fluid still has access, now through the ports 64 and 56, to the space between the pressure face 3 and the piston 4, and the movement of the latter to the right is thereby continued without interruption.

In a typical arrangement the piston and its skirt were made of steel, and the dogs 1 were made of an alloy of aluminum-nickel-bronze, hard enough to avoid scuffing off, but enough softer than the steel of the piston's skirt to avoid undue friction, and to slide thereover with reasonable freeness.

We claim as our invention:

1. In combination with a pressure-fluid-actuated skirted piston, a cylinder wherein said piston is reciprocable, and a head closing an end of said cylinder, means to lock said piston to said head comprising a sleeve projecting axially from the head into position to enter the piston's skirt as the piston approaches the limit of its movement towards the head, said sleeve having at least two radially directed, equiangularly spaced slots, a latch dog slidably mounted for radial movement in each such slot, between a locking position, wherein its outer end is projected outwardly beyond the sleeve, and a retracted position, wherein its outer end is withdrawn beneath the sleeve's outer surface, the outermost portion of each dog being beveled at at least its end which is nearer the head, the inside of the piston's skirt being complementally circumferentially beveled for locking engagement by said dogs when the latter are in their projected position, a plunger guided for axial reciprocation within said sleeve, two toggle arms pivotally mounted upon said plunger and operatively engaged with said dogs to push them outwardly when the toggle arms are rotated into alignment, for locking, or to free the dogs for inward releasing movement, by opposite axial movements of the plunger.

2. The combination of claim 1, including spring means biasing the plunger, and through the plunger the toggle arms and the dogs, towards locked position, the plunger being formed with a pressure head fitting and slidable within the sleeve, and the sleeve having a pressure-fluid inlet port to the space intermediate said pressure head and the piston, to shift the plunger in opposition to its spring-means towards unlocked position, upon entrance of fluid under pressure through said port, and simultaneously to urge the piston away from the head.

3. The combination of claim 1, including additionally shiftable retainer means positioned for engagement with the dogs to hold them retracted beneath the sleeve's peripheral surface, and also positioned for engagement by the piston as the latter approaches the limit of its movement towards the head, to be shifted by such latter engagement from dog-retaining position.

4. The combination of claim 3, wherein the retainer means includes an annulus mounted for sliding along the exterior of the sleeve, between a position wherein the dogs are retained retracted and a withdrawn position, and spring means urging said annulus towards retaining position, and thus into the locus of the piston as the latter approaches the head, to be engaged thereby and shifted to withdrawn position, for projection of the dogs into locking position by the time the piston reaches the limit of its approach to the head, and spring means biasing the toggle arms and the dogs towards projected locking position.

5. The combination of claim 4, wherein the combination further includes spring means biasing the plunger, and through the plunger the toggle arms and the dogs towards locking position, the plunger being formed with a pressure head fitting and slidable within the sleeve, and the sleeve and said annulus having complemental pressure-fluid inlet ports admitting, in either position of the annulus, to the space intermediate said pressure head and the piston, to shift the plunger in opposition to its spring means towards unlocked position, upon entrance of pressure fluid through said ports, and simultaneously to urge the piston away from the head, and subsequently to continue such movement of the piston after it is unlocked.

6. In combination with a pressure-fluid-actuated skirted piston, a cylinder wherein said piston is reciprocable, a cylinder head closing an end of the cylinder and formed with a sleeve projecting towards and of a size to enter the piston's skirt as the latter approaches a limit of its travel, wherein it is to be locked, said sleeve having at least one radially directed slot, a latching dog supported and guided for radial movement within said slot, between a projected and a retracted position, the piston's skirt being interiorly shouldered for locking engagement by said dog when the latter is projected, a plunger guided within the sleeve for axial movement, means operatively connecting said dog and said plunger, to effect radial movement of the dog into projected locking position by movement of the plunger in one axial sense, yieldable means urging the plunger in the locking sense, and said sleeve, at the side of the plunger to move the latter in the unlocking sense, being in communication with the interior of the cylinder at the side of the piston to which the pressure fluid is admitted for effecting the piston's movement from such locked, limit position.

7. In combination with a pressure-fluid-actuated skirted piston, a cylinder wherein said piston is reciprocable, a cylinder head closing an end of the cylinder and formed with a sleeve projecting towards and of a size to enter the piston's skirt as the latter approaches a limit of its travel, wherein it is to be locked, said sleeve having at least one radially directed slot, a latch dog supported and guided for radial movement within said slot between a projected and a retracted position, the outermost portion of said dog being beveled at at least its end which is nearer the cylinder head, the inside of the piston's skirt being complementally beveled, for locking engagement by said dog when the latter is projected, a plunger guided within the sleeve for axial movement, toggle elements operatively interposed between said plunger and said dogs, including stop means to position and retain said toggle elements in substantially radial locking position, aligned with the radially projected dogs, at completion of axial movement of the plunger in one axial sense, and disengageable by reverse axial movement of the plunger and consequent collapse of said toggle elements, yieldable means urging the plunger in the locking sense, and said sleeve, at the side of the plunger to move the latter in the unlocking sense, being in communication with the interior of the cylinder at the side of the piston to which the pressure fluid is admitted for effecting the piston's movement from such locked, limit position.

8. In combination with a pressure-fluid-actuated skirted piston, a cylinder wherein said piston is reciprocable, a head closing an end of said cylinder, a sleeve projecting axially from the head, spaced from the cylinder's wall, in position to enter the piston's skirt as the piston approaches the limit of its movement towards the head, said sleeve having two radially directed, diametrically opposite slots, a pair of latch dogs slidably mounted in the respective slots each for radial projective and retractive movement, the outermost portion of each dog being beveled at at least its end which is nearer the head, the inside of the piston's skirt being complementally cricumferentially beveled, for locking engagement by the dogs when the latter are projected, a plunger, including a pressure head and a yoke projecting thence towards said dogs, slidably mounted within the sleeve for axial reciprocation, means to urge said plunger away from the head and towards the piston, toggle arms operatively interconnecting the plunger's yoke and the latch dogs, to move into radial positions and to shift the dogs projectively into locking position by movement of the plunger under the influence of said urging means, or by their collapse with reverse movement of the plunger to free the dogs for retractive movement, an annulus surrounding the sleeve and shiftable axially between a retaining position wherein the ends of the retracted dogs are overlaid and held from projective movement, and a withdrawn position clear of said dogs, said annulus in its retaining position lying within the locus of the piston's skirt, for shifting by engagement thereof to its withdrawn position by the time the piston reaches its position of closest approach to the head, the annulus and the sleeve having fluid inlet ports cooperating for admission of pressure fluid to the space intermediate the plunger's pressure head and the piston, to move the plunger towards the head and so to free the toggle arms for collapse and the dogs for retractive movement, and simultaneously to move the piston away from the head, and by the complemental bevels on the piston's skirt and on the dogs to effect quick retractive movement of the dogs.

9. In combination with a guide and a member guided therein for reciprocative movement, said member having a surface which is beveled with relation to the direction of its movement, means carried by the guide to lock said member in a position at one limit of its reciprocative movement, comprising a locking dog, means supporting and guiding said dog for movement, transversely of the direction of reciprocative movement of said member, between a projected locking position and a retracted unlocked position, said dog having a beveled tip surface complemental to the bevel of the member's beveled surface, and being positioned for locking interengagement of such beveled surfaces by projection of the dog when the member reaches one limit of its reciprocative movement, a toggle device operatively engaged with said dog to move the latter into projected locking position as the toggle device rotates into alignment with the direction of the dog's movement, stop means to retain the toggle device in such aligned position, means to rotate the toggle device from such aligned position, for retraction of said dog, and means to apply simultaneously a force to the reciprocative member in the sense tending, through the interengaged beveled surfaces, to effect retraction of the dog to its unlocked position, and consequent rotation of the toggle device from its aligned position.

10. In combination with a guide and a cooperating element guided therein for reciprocative movement between a limit position and another position, one of the guide and the guided elements having a surface which is beveled with relation to the direction of reciprocation, means to lock the two relatively reciprocable elements in such limit position, comprising a locking dog means guided in the unbeveled element for movement transversely of the direction of reciprocation between a projected locking position and a retracted unlocked position, said dog means having a beveled tip surface complemental to the bevel of the cooperating element, and being positioned for locking interengagement of such beveled surfaces when the cooperating elements reach the limit position, a toggle device operatively engaged with the dog means to move the latter into projected locking position as the toggle device rotates into alignment with the direction of movement of the dog means, stop means to retain the toggle device in such aligned position, means to rotate the toggle device from such aligned position, and means to apply simultaneously a force to the reciprocative guided member in the sense tending, through the interengaged beveled surfaces, to effect retraction of the dog means to the unlocked position, and consequent rotation of the toggle device from its aligned position.

References Cited in the file of this patent

UNITED STATES PATENTS

| | | |
|---|---|---|
| 1,842,776 | Bogoslowsky | Jan. 26, 1932 |
| 2,360,535 | Ashton | Oct. 17, 1944 |
| 2,685,275 | Caldwell | Aug. 3, 1954 |

FOREIGN PATENTS

| | | |
|---|---|---|
| 362,577 | Italy | Aug. 30, 1938 |
| 579,294 | Great Britain | July 30, 1946 |